(12) United States Patent
Kaziev et al.

(10) Patent No.: US 11,982,974 B2
(45) Date of Patent: May 14, 2024

(54) FLEXIBLE PRINTED MATERIAL

(71) Applicant: Hewlett-Packard Development Company, L.P., Spring, TX (US)

(72) Inventors: Boris Kaziev, Ness Ziona (IL); Inna Tzomik, Ness Ziona (IL); Faina Kogan, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 533 days.

(21) Appl. No.: 17/417,421

(22) PCT Filed: Jul. 18, 2019

(86) PCT No.: PCT/US2019/042427
§ 371 (c)(1),
(2) Date: Jun. 23, 2021

(87) PCT Pub. No.: WO2021/011006
PCT Pub. Date: Jan. 21, 2021

(65) Prior Publication Data
US 2022/0091520 A1     Mar. 24, 2022

(51) Int. Cl.
*G03G 8/00*        (2006.01)
*C09D 11/101*      (2014.01)
*C09D 11/107*      (2014.01)
*G03G 5/14*        (2006.01)
*G03G 5/147*       (2006.01)
*G03G 9/13*        (2006.01)

(52) U.S. Cl.
CPC ............ *G03G 8/00* (2013.01); *C09D 11/101* (2013.01); *C09D 11/107* (2013.01); *G03G 5/14* (2013.01); *G03G 5/147* (2013.01); *G03G 9/13* (2013.01)

(58) Field of Classification Search
CPC ............ G03G 8/00; G03G 5/14; G03G 5/147; G03G 9/13; C09D 11/101; C09D 11/107
See application file for complete search history.

(56) References Cited

U.S. PATENT DOCUMENTS

| 2009/0176109 A1 | 7/2009 | Chun et al. |
| 2017/0236610 A1 | 8/2017 | Wu et al. |

(Continued)

FOREIGN PATENT DOCUMENTS

| EP | 3295250 | 3/2018 |
| EP | 3414626 | 12/2018 |

(Continued)

*Primary Examiner* — Joseph S Wong
(74) *Attorney, Agent, or Firm* — HP Inc. Patent Department

(57) ABSTRACT

A method of forming a flexible printed material is described. The method comprises applying a layer of primer onto a flexible substrate; electrostatically printing onto the layer of primer a liquid electrostatic ink composition; applying a curable overprint varnish composition onto the printed electrostatic ink composition and curing the overprint varnish composition using electron beam irradiation. The curable overprint varnish composition comprises an ethylenically unsaturated monomer, an ethylenically unsaturated oligomer, or mixtures thereof, and less than 10 wt. % of a cross-linking additive based on the total weight of the curable overprint varnish composition. A flexible package comprising the flexible printed material is also described.

15 Claims, 1 Drawing Sheet

(56) References Cited

U.S. PATENT DOCUMENTS

2017/0320253 A1    11/2017   Salant et al.
2018/0246428 A1     8/2018   Tulchinski et al.
2018/0327616 A1    11/2018   Becker et al.

FOREIGN PATENT DOCUMENTS

| JP | 05202317 | 8/1993 | |
|----|----------|--------|---|
| JP | 2011093306 | 5/2011 | |
| JP | 2011102027 | 5/2011 | |
| WO | 2016128046 | 8/2016 | |
| WO | WO-2016162052 A1 * | 10/2016 | ............. C09D 11/00 |
| WO | WO-2017067610 A1 * | 4/2017 | ............ B41M 1/305 |
| WO | WO-2017157615 | 9/2017 | |
| WO | 2018050245 | 3/2018 | |
| WO | 2018192651 | 10/2018 | |

\* cited by examiner

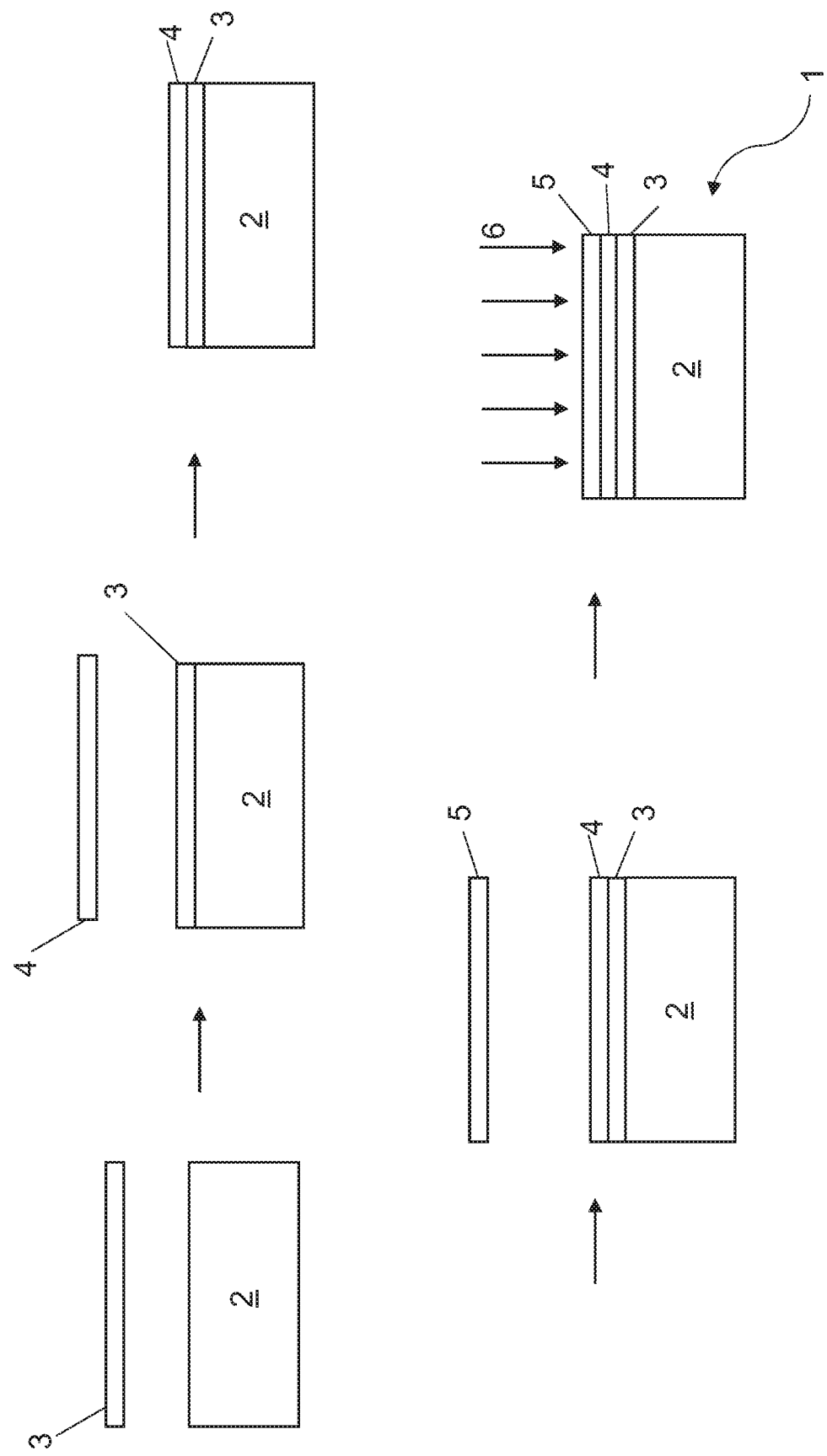

FLEXIBLE PRINTED MATERIAL

BACKGROUND

Flexible printed materials may be used to package and/or identify all manner of consumer goods, the printed images used, for example, to provide information, or corporate branding etc. to provide information to the user regarding the nature and origin of a product.

Some existing flexible printed materials have be found to be vulnerable to raised temperatures, mechanical wear and/or chemicals.

BRIEF DESCRIPTION OF THE FIGURE

FIG. 1 shows a schematic process for producing a printed material.

DETAILED DESCRIPTION

Before the compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a", "an", and "the" include plural referents unless the context clearly dictates otherwise.

As used herein, "liquid carrier", "carrier", or "carrier vehicle" refer to the fluid in which the polymer resin, pigment(s), charge directors and/or other additives can be dispersed to form a liquid electrostatic ink or inkjet ink. Liquid carriers can include a mixture of a variety of different agents, such as surfactants, co-solvents, viscosity modifiers, humectants, sequestering agents, buffers, biocides and/or other possible ingredients.

As used herein, "electrostatic ink composition" generally refers to an ink composition, which may be in liquid form, generally suitable for use in an electrostatic printing process, sometimes termed an electrophotographic printing process. The electrostatic ink composition may include chargeable particles suspended in a liquid carrier, which may be as described herein.

As used herein, oligomers are short polymers which may contain no more than 100 monomers. In some examples, oligomers are polymers that have a chain length of 100 monomers or less, for example, 50 monomers or less, for example, 40 monomers or less, for example, 30 monomers or less, for example, 20 monomers or less, for example, 15 monomers or less or, for example, 10 monomers or less.

As used herein, "co-polymer" refers to a polymer that is polymerized from at least two monomers. However, a copolymer of a particular list of monomer types (e.g., a copolymer of monomer A and monomer B) refers to a copolymer that is polymerized from monomers of those types and no other types of monomer (e.g. an AB polymer).

As used herein, "total base number" (TBN), sometimes simply referred to as base number, may be determined using standard techniques, including, those laid out in ASTM Designation D4739-08, such as Test Method D2896, Test Method D4739, and ASTM Designation D974-08, with Test Method D2896 being used if any discrepancy is shown between test methods, and unless otherwise stated, the test method(s) will be the most recently published at the time of filing this patent application. "mgKOH/g material" indicates "mgKOH per gram of dispersant". The measurement of TBN of the dispersant can either be on the pure dispersant, or a dispersant in water or a hydrocarbon liquid, such as 60 wt % dispersant in white spirit, e.g. dearomatized white spirit, mineral oil or distillate (e.g. $C_{10-20}$ hydrocarbons), and then adjusted as if it had been measured on the pure dispersant.

As used herein, "melt flow rate" generally refers to the extrusion rate of a resin through an orifice of defined dimensions at a specified temperature and load, usually reported as temperature/load, for example, 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

As used herein, "liquid electrostatic(ally) printing" or "liquid electrophotographic(ally) printing" generally refers to the process that provides an image that is transferred from a photo imaging substrate or plate either directly or indirectly via an intermediate transfer member to a print substrate, for example, a polymer substrate. As such, the image is not substantially absorbed into the photo imaging substrate or plate on which it is applied. Additionally, "liquid electrophotographic printers" or "liquid electrostatic printers" generally refer to those printers capable of performing electrophotographic printing or electrostatic printing, as described above. A liquid electrophotographic (LEP) printing process may involve subjecting a liquid electrophotographic ink composition to an electric field, for example, an electric field having a field strength of 1000 V/cm or more, in some examples, 1000 V/mm or more.

As used herein, "LEP image" or "printed LEP image" refer to an image which has been printed, for example, on a print substrate, by liquid electrophotographically printing a LEP ink composition described herein.

As used herein, "NVS" is an abbreviation of the term "non-volatile solids".

As used herein, the term "retort package" or "retort pouch" is to be understood as being a multilayer laminate material of flexible plastic and metal foils used for sterile packaging of food and drink.

As used herein, the term "about" is used to provide flexibility to a numerical range endpoint by providing that a given value may be a little above or a little below the endpoint. The degree of flexibility of this term can be dictated by the particular variable.

If a standard test is mentioned herein, unless otherwise stated, the version of the test to be referred to is the most recent at the time of filing this patent application.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not just the explicitly recited values of about 1 wt. % to about 5 wt. %, but also to include individual values and subranges within the indicated range. Thus, included in this numerical range are individual values such as 2, 3.5, and 4 and sub-ranges such as from 1-3, from 2-4, and from 3-5, and so on. This same principle applies to ranges reciting a single numerical value. Furthermore, such an interpretation should apply regardless of the breadth of the range or the characteristics being described.

As used herein, unless specified otherwise, wt. % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect there is provided a method of forming a flexible printed material, comprising:
applying a layer of primer onto a flexible substrate;
electrostatically printing onto the layer of primer a liquid electrostatic ink composition;
applying a curable overprint varnish composition onto the printed electrostatic ink composition, wherein the curable overprint varnish composition comprises an ethylenically unsaturated monomer, an ethylenically unsaturated oligomer, or mixtures thereof, and 10 wt. % or less of a cross-linking additive based on the total weight of the curable overprint varnish composition; and
curing the overprint varnish composition using electron beam irradiation.

In another aspect there is provided a flexible printed material, comprising:
a flexible substrate;
a primer layer disposed on the flexible substrate;
an electrostatic ink composition printed on the primer layer; and
an overprint varnish composition on the printed electrostatic ink composition, wherein the overprint varnish composition is formed from an ethylenically unsaturated monomer, an ethylenically unsaturated oligomer, or mixtures thereof, and 10 wt. % or less of a cross-linking additive based on the total weight of the curable overprint varnish composition.

In another aspect there is provided a flexible package, comprising a flexible printed material comprising:
a flexible substrate;
a primer layer disposed on the flexible substrate;
an electrostatic ink composition electrostatically printed on the primer layer; and
an overprint varnish composition on the printed electrostatic ink composition, wherein the overprint varnish composition is formed from an ethylenically unsaturated monomer, an ethylenically unsaturated oligomer, or mixtures thereof, and 10 wt. % or less of a cross-linking additive based on the total weight of the curable overprint varnish composition.

The present inventors have found that examples of the methods and products as described herein avoid or at least mitigate at least one of the difficulties described above. They have found that examples of the method and products are more successful than previous methods in that the materials produced have been found to have improved thermal resistance, mechanical resistance and/or chemical resistance.

Flexible Printed Material

In some examples, a flexible printed material is described, in some examples a printed packaging material or a flexible printed packaging material. The flexible printed material may be produced by any of the methods described herein. Each component of the flexible printed material will be discussed in the sections which follow. The flexible printed material described and produced is particularly suited to the harsh temperature and pressure conditions inside a retort or autoclave, thus rendering the material suitable for use as a packaging material for retort food pouches.

Flexible Substrate

The flexible substrate to which an ink composition may be printed (and thus is also referred to herein as the print substrate or flexible print substrate) may be any flexible material suitable for use in a printed material, e.g. a flexible printed packaging material. In some examples, the flexible substrate may be a flexible substrate for use in retort applications, i.e. sterile packing of food and drinks in flexible pouches.

The flexible print substrate of the flexible printed material may also be referred to as a functional substrate or simply a base layer. The flexible print substrate of the printed material may be the innermost layer of a printed packaging material (e.g. a flexible printed packaging material) in use, and may thus be in contact with packaged goods. In some examples the flexible print substrate is referred to as a functional substrate and is functional in the sense that it provides a barrier function to protect packaged goods. The flexible print substrate or functional substrate may serve as a barrier to any external influence that could damage or otherwise reduce the quality of packaged goods, in particular food, by preventing ingress of, for example, moisture, oxygen, other oxidants and pathogens such as viruses and bacteria.

The flexible print substrate may be any suitable substrate. The flexible print substrate may be any suitable flexible print substrate capable of having an image printed thereon. The flexible substrate may include a material selected from an organic or inorganic material. The flexible material may include a natural polymeric material, e.g. cellulose. The flexible material may include a synthetic polymeric material, e.g. a polymer formed from alkylene monomers, including, for example, polyethylene and polypropylene, and co-polymers such as styrene-polybutadiene. The polypropylene may, in some examples, be biaxially orientated polypropylene. The flexible material may include a metal, which may be in sheet form. The metal may be selected from or made from, for instance, aluminium (Al), silver (Ag), tin (Sn), copper (Cu), mixtures thereof. In an example, the flexible substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate.

The substrate is, in some examples, a cellulosic print substrate such as paper. The cellulosic print substrate is, in some examples, a coated cellulosic print. In some examples, a primer may be coated onto the print substrate, before the LEP ink is printed onto the print substrate. In some examples, the print substrate is a transparent print substrate, for example the print substrate may be formed from a transparent material such as a transparent polymeric material, e.g. a polymer formed from alkylene monomers, including, for example, polyethylene and polypropylene, and co-polymers such as styrene-polybutadiene.

In some examples, the flexible print substrate comprises a film or sheet, e.g. a thin film or thin sheet, of paper, metallic foil, and a plastic material. In some examples, the print substrate comprises a metallic foil or a metallized substrate. In some examples, the print substrate comprises a metallized paper or a metallized plastic film. In some examples, the print substrate comprises an aluminium foil. In some examples, the print substrate comprises a polymeric material. In some examples the print substrate comprises a film, e.g. a thin film, of a plastic material, for example, polyethylene (PE), linear low density polyethylene (LLDPE), low density polyethylene (LDPE), medium density polyethylene (MDPE), high density polyethylene (HDPE) polypropylene (PP), cast (cPP) or axially oriented polypropylene (BOPP), oriented polyamide (OPA), or polyethylene terephthalate (PET).

In some examples, the flexible print substrate comprises a plurality of layers of film of material laminated together to form a pre-laminated flexible print substrate. In some examples, the flexible print substrate comprises a plurality of layers of material selected from polymeric materials (e.g. polymeric materials selected from PE, LLDPE, MDPE, PP, BOPP, PET and OPA), metallic materials (e.g. metallic foils such as aluminium foil, or metallized films such as met-PET, met-BOPP or any other metalized substrate), paper and combinations thereof. In some examples, the flexible print substrate comprises a plurality of layers of film of a plastic material, such as a combination of films selected from PE, LLDPE, MDPE, PP, BOPP, PET and OPA, laminated together to form the pre-laminated flexible print substrate. In some examples, the pre-laminated flexible print substrate comprises an aluminium layer. In some examples, the pre-laminated flexible print substrate comprises a Paper/Alu/PE, PET/Al/PE, BOPP/met-BOPP or PET/PE laminate.

In some examples, the flexible print substrate comprises a metallized paper in the form of a paper substrate coated on one surface with a layer of metal, for example aluminium.

In some examples, the flexible print substrate comprises a metallized plastic film in the form of a polymer substrate coated on one surface with a layer of metal, for example aluminium. In some examples, the print substrate comprises a metallized plastic film in the form of a metallized BOPP film or a metallized PET film.

In some examples, the print substrate comprises a thin film of material, wherein the film is less than 600 µm in thickness, for example less than 250 µm in thickness, for example less than 200 µm in thickness, for example less than 150 µm in thickness, for example less than 100 µm in thickness for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In some examples, the film of material is about 12 µm in thickness.

In some examples, the print substrate comprises a thin film of material, wherein the film is greater than 12 µm in thickness, for example greater than 15 µm in thickness, greater than 20 µm in thickness, greater than 30 µm in thickness, greater than 40 µm in thickness, greater than 50 µm in thickness, greater than 60 µm in thickness, greater than 70 µm in thickness, greater than 80 µm in thickness, greater than 90 µm in thickness. In some examples, the film of material greater than about 100 µm in thickness, in some examples about 100 µm in thickness.

In some examples, the flexible print substrate has a first surface on which an ink composition may be printed. In some examples, the flexible print substrate has a second surface which is a surface other than the surface on which the ink composition in use is printed, for example the second surface may be a surface opposing the first surface of the flexible print substrate.

In some examples, the flexible substrate comprises a sealant layer disposed on a surface of the flexible print substrate other than a surface to which the ink composition is printed, e.g. the sealant layer may be disposed on a second surface of the print substrate. In some examples, the print substrate has a first surface on which the ink composition is printed and a second surface on which a sealant layer may be disposed.

In some examples, the sealant layer is disposed on the innermost surface of a flexible printed material, e.g. the flexible printed packaging material, and serves to provide means for sealing the flexible printed material to itself or another material, with the goods to be packaged inside, for example to form a flexible printed packaging material. In some examples the sealant layer comprises a film of low-melting, i.e. heat sealable, thermoplastic material. Suitable thermoplastic materials include those described herein in connection with the polymer resin (the polymer resin described herein being an example of a thermoplastic resin of an ink composition when the ink composition is an electrostatic ink composition) and include polymers of ethylene, or DuPont's SURLYN ionomers. In some examples, the sealant layer comprises an extrudable material.

In some examples, the sealant layer comprises a thin film of a polymer, wherein the film is less than 100 µm in thickness, for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In some examples, the film of polymer is about 12 µm in thickness.

In some examples, the sealant layer comprises a thin film of a polymer, wherein the film is greater than 12 µm in thickness, for example greater than 15 µm in thickness, greater than 20 µm in thickness, greater than 30 µm in thickness, greater than 40 µm in thickness, greater than 50 µm in thickness, greater than 60 µm in thickness, greater than 70 µm in thickness, greater than 80 µm in thickness, greater than 90 µm in thickness. In some examples, the film of polymer is about 100 µm in thickness.

Primer

The flexible substrate may have a primer on a surface onto which the ink composition is printed. In some examples, the print substrate has a first surface on which a primer is disposed, the ink composition may then be printed on the primer disposed on the surface of the print substrate.

The primer comprises a primer resin. In some examples, the primer resin may be selected from the group comprising or consisting of hydroxyl containing resins, carboxylic group containing resins, and amine based polymer formulations. In some examples a hydroxyl containing resin may be selected from polyvinyl alcohol resins, e.g. polyvinyl alcohol based as polyvinyl butyral formulation (Butvar, Eastman), Vinnol® (Wacker polymers), cellulose derivative additives (Eastman), polyester (Dynapol, Evonic) and polyurethane based formulation with hydroxyl groups. In some examples, the carboxylic group containing resins may be selected from: olefin co-acrylic or methacrylic acid based copolymers, polyacrylic acid based polymers, polylactic acid based polymers. In some examples, the amine based polymer formulations may be selected from polyamines, polyethylene imines. The primer resin may be selected from the group comprising, or consisting of, a polyvinyl alcohol resin, cellulose based resins, a polyester, a polyamine, a polyethylene imine resin, polyamide resin, polyurethane, copolymers of an alkylene monomer and an acrylic or methacrylic acid monomer, and polyacrylic polymers In some examples, the primer resin comprises a carboxylic functional group, an amine functional group or a polyol functional group. In some examples, the primer resin comprises an amine functional group or a carboxylic functional group.

In some examples, the primer resin comprises an amine functional group. In some examples, the primer resin comprises or consists of a polyethylene imine resin. An example of a material suitable as a primer is DP050 (available from Michelman, Inc.).

In some examples, the primer layer on the print substrate of the printed material comprises a crosslinked primer resin.

In some examples, the primer on the surface of the flexible print substrate surface onto which the ink composition is printed is provided in an amount such that the coat weight of the primer resin on the print substrate is at least 0.01 $g/m^2$, in some examples at least 0.05 $g/m^2$, in some examples at least 0.1 $g/m^2$, in some examples at least 0.15 $g/m^2$, in some examples about 0.18 $g/m^2$. In some examples the primer is provided in an amount such that the coat weight of the primer resin on the print substrate is up to about 0.2 $g/m^2$, in some examples up to about 0.5 $g/m^2$, in some examples up to about 1 $g/m^2$, in some examples up to about 1.5 $g/m^2$, in some examples up to about 1.6 $g/m^2$, in some examples up to about 1.7 $g/m^2$, in some examples up to about 1.8 $g/m^2$, in some examples up to about 1.9 $g/m^2$, in some examples up to about 2.0 $g/m^2$.

Liquid Electrostatic Ink Composition

Electrostatic printing, e.g. liquid electrostatic printing, is one method by which images or information can be printed onto substrates such as paper or plastic. The printing processes generally involve creating an image on a photoconductive surface, applying an ink or toner having charged particles to the photoconductive surface, such that they selectively bind to the image, and then transferring the charged particles in the form of the image to a print substrate.

The ink composition printed on the print substrate described herein may be an liquid electrostatic ink composition, for example a liquid electrophotographic printing composition (also referred to herein as a LEP composition), printed on the print substrate using an electrophotographic printing process, e.g. a LEP printing process. The liquid electrostatic ink composition which may be printed onto the flexible print substrate, for example a first surface of the flexible print substrate on which a primer is disposed, may comprise a thermoplastic resin.

In some examples, the thermoplastic resin of the ink composition comprises a carboxylic functional group, an amine functional group or a polyol functional group. In some examples, the thermoplastic resin of the ink composition comprises a carboxylic functional group.

In some examples, the thermoplastic resin comprises a polymer having acidic side groups. In some examples, the acidic side groups may be in free acid form or may be in the form of an anion and associated with a counterion, generally metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

In some examples, the thermoplastic resin of the ink composition comprises polyolefin copolymers, polyethylene co-acrylic copolymers, polyethylene co-methacrylic copolymers, polyethylene co-vinyl acetate copolymers, ionomers, or combinations thereof. In some examples the thermoplastic resin of the ink composition comprises or consists of alkylene acrylic or methacrylic acid resins, polyurethane resins, polyethylene imine resins, polyamide resin, polyvinyl alcohol and combinations thereof.

In some examples the electrostatic ink composition comprises a thermoplastic resin comprising a copolymer of an alkylene monomer and a monomer selected from acrylic acid and methacrylic acid.

In some examples, the electrostatic ink composition may comprise a colorant or pigment and a polymer resin. An LEP composition may comprise a colorant or pigment, a polymer resin and a carrier fluid or liquid. The LEP composition may further comprise an additive such as a charge director, charge adjuvant, surfactant, viscosity modifier, emulsifier and the like. In some examples, the LEP composition may not contain any pigment, or comprise substantially zero pigment and thus be a pigment-free composition, useful in providing a particular transparent gloss or sheen to a printed substrate.

In some examples, after printing, a LEP ink composition, which may be printed on the print substrate, may comprise a reduced amount of carrier liquid compared with the LEP printing composition before printing. In some examples, a LEP ink composition, which may be printed on the print substrate, may be substantially free from carrier liquid. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, an electrostatic ink composition that may be printed on the print substrate is free from carrier liquid.

Each of these components of an electrostatic ink composition, which may be the ink composition printed on the print substrate, will be described separately in the sub-sections which follow.

Colorant

A liquid electrostatic ink composition may comprise a colorant. The colorant may be a dye or pigment. The colorant can be any colorant compatible with the liquid carrier and useful for electrophotographic printing. For example, the colorant may be present as pigment particles, or may comprise a resin (in addition to the polymers described herein) and a pigment. The resins and pigments can be any of those standardly used.

In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW SGT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of $TiO_2$, calcium carbonate, zinc oxide, and mixtures thereof. In some examples the white pigment particle may comprise an alumina-$TiO_2$ pigment.

In some examples, the colorant or pigment particles may have a median particle size or $d_{50}$ of less than 20 μm, for example less than 15 μm, for example less than 10 μm, for example less than 5 μm, for example less than 4 μm, for example less than 3 μm, for example less than 2 μm, for example less than 1 μm, for example less than 0.9 μm, for example less than 08 μm, for example less than 0.7 μm, for example less than 0.6 μm, for example less than 0.5 μm. Unless otherwise stated, the particle size of the colorant or pigment particle and the resin coated pigment particle is determined using laser diffraction on a Malvern Mastersizer 2000 according to the standard procedure as described in the operating manual.

The colorant or pigment particle may be present in an electrostatic ink composition in an amount of from 10 wt % to 80 wt % of the total amount of resin and pigment, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and colorant. In some examples, the colorant or pigment particle may be present in an electrostatic ink composition in an amount of at least 50 wt % of the total amount of resin and colorant or pigment, for example at least 55 wt % of the total amount of resin and colorant or pigment.

Polymer Resin

In some examples, the ink composition is an electrostatic ink composition comprising a polymer resin as the thermoplastic resin. In some examples, the electrostatic ink composition comprises a polymer resin comprising a polymer having acidic side groups. In some examples, the electrostatic ink composition comprises a polymer resin comprising a copolymer of an alkylene monomer and a monomer selected from acrylic acid and methacrylic acid.

The polymer resin or thermoplastic resin may be referred to as a thermoplastic polymer. In some examples, the polymer resin may comprise ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene;

isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers or combinations thereof.

The polymer resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures, for example using the procedure described in ASTM D1386.

The polymer resin may comprise a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures, for example as described in ASTM D1238.

The acidic side groups may be in free acid form or may be in the form of an anion and associated with a counterion, generally metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The polymer resin may comprise two different polymers having acidic side groups. The two polymers having acidic side groups may have different acidities, which may fall within the ranges mentioned above. The polymer resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The polymer resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The polymer resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The polymer resin may comprise a first polymer having a melt viscosity of 15000 poise or more, in some examples 20000 poise or more, in some examples 50000 poise or more, in some examples 70000 poise or more; and in some examples, the polymer resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The polymer resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the polymer resin comprises a single type of polymer, the polymer (excluding any other components of the electrophotographic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the polymer resin comprises a plurality of polymers all the polymers of the polymer resin may together form a mixture (excluding any other components of the electrophotographic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The polymer resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The polymer resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The polymer resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the liquid electrophotographic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the liquid electrophotographic composition and/or the ink printed on the print substrate. The polymer having ester side groups may constitute from 5% to 50% by weight of the total amount of the resin polymers, e.g. thermoplastic resin polymers, in the liquid electrophotographic composition and/or the ink printed on the print substrate, in some examples 10% to 40% by weight of the total amount of the resin polymers, e.g. thermoplastic resin polymers, in the liquid electrophotographic composition and/or the ink composition printed on the print substrate, in some examples 5% to 30% by weight of the total amount of the resin polymers, e.g. thermoplastic resin polymers, in the liquid electrophotographic composition and/or the ink composition printed on the print substrate, in some examples 5% to 15% by weight of the total amount of the resin polymers, e.g. thermoplastic resin polymers, in the liquid electrophotographic composition and/or the ink composition printed on the print substrate in some examples 15% to 30% by weight of the total amount of the resin polymers, e.g. thermoplastic resin polymers, in the liquid electrophotographic composition and/or the ink composition printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the thermoplastic resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the AC family of toners (e.g. AC-5120, AC-5180, AC-540, AC-580 (sold by Honeywell)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The polymer resin can constitute about 5 to 90%, in some examples about 50 to 80%, by weight of the solids of the liquid electrophotographic composition and/or the ink composition printed on the print substrate. The resin can constitute about 60 to 95%, in some examples about 70 to 95%, by weight of the solids of the liquid electrophotographic composition and/or the ink composition printed on the print substrate.

Carrier Liquid

In some examples, an electrostatic ink composition described herein comprises polymer resin coated pigment particles, or polymer resin particles, which are formed in and/or dispersed in a carrier fluid or carrier liquid. Before application to the print substrate, e.g. the print substrate, in a printing process, e.g. an electrostatic printing process, the ink composition may be an electrostatic ink composition, which may be in dry form, for example in the form of flowable pigment particles coated with the thermoplastic resin. In some examples, before application to the print substrate in an electrostatic printing process, an electrostatic ink composition may be in liquid form; and may comprise a carrier liquid in which is suspended pigment particles coated with the thermoplastic resin.

Generally, the carrier liquid acts as a reaction solvent in preparing the coated pigment particles, and can also act as a dispersing medium for the other components in the resulting electrostatic ink composition. In some examples, the carrier liquid is a liquid which does not dissolve the polymer resin at room temperature. In some examples, the carrier liquid is a liquid which dissolves the polymer resin at elevated temperatures. For example, the polymer resin may be soluble in the carrier liquid when heated to a temperature of at least 80° C., for example 90° C., for example 100° C., for example 110° C., for example 120° C. For example, the carrier liquid can comprise or be a hydrocarbon, silicone oil, vegetable oil, etc. The carrier liquid can include an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include hydrocarbons. The hydrocarbon can include an aliphatic hydrocarbon, an isomerized aliphatic hydrocarbon, branched chain aliphatic hydrocarbons, aromatic hydrocarbons, and combinations thereof. Examples of the carrier liquids include aliphatic hydrocarbons, isoparaffinic compounds, paraffinic compounds, dearomatized hydrocarbon compounds, and the like. In particular, the carrier liquids can include Isopar-G™, Isopar-H™, IsoparL™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the carrier liquid can constitute about 20% to 99.5% by weight of an electrostatic ink composition, in some examples 50% to 99.5% by weight of an electrostatic ink composition. Before printing, the carrier liquid may constitute about 40 to 90% by weight of an electrostatic ink composition. Before printing, the carrier liquid may constitute about 60% to 80% by weight of an electrostatic ink composition. Before printing, the carrier liquid may constitute about 90% to 99.5% by weight of an electrostatic ink composition, in some examples 95% to 99% by weight of an electrostatic ink composition.

An electrostatic ink composition, when printed on a print substrate, e.g. the print substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on a print substrate, e.g. the print substrate, is free from carrier liquid.

Charge Director and Charge Adjuvant

A liquid electrophotographic composition and/or the ink composition printed on the print substrate can comprise a charge director. A charge director can be added to an electrostatic composition to impart a charge of a desired polarity and/or maintain sufficient electrostatic charge on the particles of an electrostatic ink composition. The charge director may comprise ionic compounds, including, for example, metal salts of fatty acids, metal salts of sulfosuccinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from oil-soluble petroleum sulfonates (e.g. neutral Calcium Petronate™, neutral Barium Petronate™, and basic Barium Petronate™) polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, for example, barium, sodium, calcium, and aluminium salts of sulfonic acid. The sulfonic acids may include, for example, alkyl sulfonic acids, aryl sulfonic acids, and sulfonic acids of alkyl succinates (e.g. see WO 2007/130069). The charge director can impart a negative charge or a positive charge on the resin-containing particles of an electrostatic ink composition.

The charge director can comprise a sulfosuccinate moiety of the general formula: $[R_a\text{—O—C(O)CH}_2\text{CH(SO}_3^-\text{)C(O)—O—}R_b]$, where each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_a\text{—O—C(O)CH}_2\text{CH(SO}_3^-\text{)C(O)—O—}R_b]$, where each of $R_a$ and $R_b$ is an alkyl group, or other charge directors as found in WO2007130069, which is incorporation herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba $NH_4$, tert-butyl ammonium, $Li^+$, and $Al^{+3}$ or from any sub-group thereof. The simple salt may comprise an anion selected from $SO_4^{2-} PO^{3-}$, $NO_3^-$, $HPO_4^{2-}$, $CO_3^{2-}$, acetate, trifluoroacetate (TFA), $Cl^-$, Bf, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula $[R_a-O-C(O)CH_2CH(SO_3)C(O)-O-R_b]$, in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a-O-C(O)CH_2CH(SO_3^-)C(O)-O-R_b]$ and/or the formula $MA_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an electrostatic ink composition, the charge director can constitute about 0.001% to 20%, in some examples 0.01 to 20% by weight, in some examples 0.01 to 10% by weight, in some examples 0.01 to 1% by weight of the solids of an electrostatic ink composition and/or ink composition printed on the print substrate. The charge director can constitute about 0.001 to 0.15% by weight of the solids of a liquid electrophotographic ink composition and/or ink composition printed on the print substrate, in some examples 0.001 to 0.15%, in some examples 0.001 to 0.02% by weight of the solids of a liquid electrophotographic ink composition and/or ink composition printed on the print substrate. In some examples, a charge director imparts a negative charge on an electrostatic ink composition. The particle conductivity may range from 50 to 500 μmho/cm, in some examples from 200-350 μmho/cm.

A liquid electrophotographic ink composition and/or ink composition printed on the print substrate can include a charge adjuvant. A charge adjuvant may be present with a charge director, and may be different to the charge director, and act to increase and/or stabilise the charge on particles, e.g. resin-containing particles, of an electrostatic composition. The charge adjuvant can include barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of a liquid electrophotographic ink composition and/or ink composition printed on the print substrate. The charge adjuvant can constitute about 0.5 to 4% by weight of the solids of a liquid electrophotographic ink composition and/or ink composition printed on the print substrate. The charge adjuvant can constitute about 1 to 3% by weight of the solids of a liquid electrophotographic ink composition and/or ink composition printed on the print substrate.

Other Additives

In some examples, an electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Curable Overprint Varnish Composition

In some examples, the printed material may comprise an over print varnish (OPV) composition disposed on the printed ink layer of the printed material. In some examples, the curable overprint varnish composition comprises an ethylenically unsaturated monomer, an ethylenically unsaturated oligomer, or mixtures thereof, and 10 wt. % or less of a cross-linking additive based on the total weight of the curable overprint varnish composition.

In some examples, the OPV is an electron beam OPV (e.g. an OPV comprising an OPV EB curable resin). Suitable OPV are standardly used OPVs to which the cross-linking additive has been added.

In some examples the OPV is a water-based OPV (e.g. an OPV comprising an OPV dispersed in water), or a solvent-based OPV (e.g. an OPV comprising an OPV resin dissolved in an organic solvent such as ethyl acetate, n-propanol or ethanol).

In some examples, the ethylenically unsaturated monomers and/or oligomers may be selected from styrenes, acrylates, methacrylates, allyl-containing compounds, alkenylcarboxylic acids, alkenyl esters, alkenyl amides, dienes, alkenylcyanides, alkenylethers, urethanes, alkenyl alcohols, alkenyl thiols, alkenyl halides or a combination thereof. In some examples, the ethylenically unsaturated monomers and/or oligomers may be acrylates or urethanes.

In some examples, the curable overprint varnish composition comprises radiation curable ethylenically unsaturated monomers. In some examples, the ethylenically unsaturated monomers are selected from monofunctional monomers (such as isobornyl acrylate), bifunctional monomers (such as tripropylene glycol diacrylate) and trifunctional monomers (such as trimethylol propane triacrylate). The type of monomer included in the curable overprint varnish composition may affect the curing and/or coating properties, such as the flexibility, adhesiveness, gloss and viscosity.

In some examples, the curable overprint varnish composition comprises ethylenically unsaturated oligomers. In some examples, the ethylenically unsaturated oligomers are selected from epoxy acrylates, epoxy methacrylates (such as those based on Bisphenol or the like), urethane acrylates, urethane methacrylates, polyester acrylates, polyester methacrylates, acrylic methacrylates, and methacrylic acrylates.

In some examples, the curable overprint varnish composition comprises an acrylate selected from mono-, di-, tri- and tetra-acrylates. In some examples, the curable overprint varnish composition comprises an acrylate selected from di-, tri- and tetra-acrylates.

In some examples, the curable overprint varnish composition comprises a compound selected from 2,2-bis(acryloyloxymethyl)butyl acrylate, 2-[(acryloyloxy)methyl]-2-({2,2-bis[(acryloyloxy)methyl]butoxy}methyl)butylacrylate, oxydi-1,1-propanediyl bisacrylate, hexamethylene diacrylate, (1-methyl-1,2-ethanediyl)bis([oxy(methyl-2,1-ethanediyl)]di-acrylate, 2-(2,2-bis{[2-acryloyloxy)ethanoxy]methyl}butoxy)ethyl acrylate, and 2,2-bis-(acryloyloxymethyl)butylacrylate.

In some examples, the curable overprint varnish composition comprises an oligomer of 4,4'-(1-methylethylidene)bisphenol, (chloromethyl)oxirane and acrylate.

In some examples, the curable overprint varnish composition comprises a compound selected from dipropylene glycol diacrylate, 2,2-bis(acryloyloxymethyl)butyl acrylate and (1-methyl-1,2-ethanediyl)bis[oxy(methyl-2,1-ethanediyl)]diacrylate. In some examples, the curable overprint varnish composition comprises dipropylene glycol diacrylate, 2,2-bis(acryloyloxymethyl)butyl acrylate and (1-methyl-1,2-ethanediyl)bis-[oxy(methyl-2,1-ethanediyl)] diacrylate.

In some examples, the curable overprint varnish composition comprises a mixture of dipropylene glycol diacrylate, 2,2-bis(acryloyloxymethyl)butyl acrylate, (1-methyl-1,2-ethanediyl)bis[oxy(methyl-2,1-ethanediyl)]diacrylate and an oligomer of 4,4'-(1-methyl-ethylidene)bisphenol, (chloromethyl)oxirane and acrylate.

In some examples, the curable overprint varnish composition comprises a mixture of acrylated oligomers, hexamethylene diacrylate, (1-methyl-1,2-ethanediyl)bis([oxy(methyl-2,1-ethanediyl)] diacrylate and acrylated polysiloxanes.

In some examples the OPV comprises an OPV resin comprising an acrylate resin, a polyurethane resin or a nitrocellulose resin. When the OPV resin comprises a polyurethane resin, the OPV resin may comprise a one component or a two component polyurethane resin.

In some examples, the OPV is selected from a water-based OPV comprising acrylate resin or polyurethane resin; a solvent-based OPV comprising nitrocellulose resin or polyurethane resin; and a OPV comprising (meth)acrylate resin or polyurethane resin. In some examples, the OPV comprises a reactive polyurethane, which may be used in combination with a carrier liquid and therefore in the form of a polyurethane dispersion. The polyurethane dispersion may include polymer strands with acrylate or methacrylate reactive groups in capping units at the ends of the strands. In some examples, the OPV comprises a radiation curable polyurethane resin selected from acrylated polyurethane resins or methacrylated polyurethane resins.

In some examples, the OPV comprises a polyurethane dispersion comprising an acrylamide-based radiation curable polyurethane dispersion. In some examples, the acrylamide-based polyurethane dispersion may be pH stable and ASL stable. ASL stable refers to accelerated storage life stability, and is evaluated by placing the dispersion in an oven at 50° C. for 7 days.

In some examples, the OPV comprises a radiation curable polyurethane dispersion comprising allyl-based polyurethane dispersions, which may be pH stable and ASL stable.

In some examples, the OPV comprises a radiation curable polyurethane dispersion comprising styrene-based polyurethane dispersions, which may be pH stable and ASL stable.

In some examples, the OPV comprises a radiation curable polyurethane dispersion comprising polyurethane synthesised by combining acrylate or methacrylate raw materials with blends of two isocyanates and a diol without using acid stabilizing groups as part of the backbone. In some examples, the radiation curable polyurethane dispersion may comprise polyurethane synthesized by combining isocyanates with Bisphenol A-free acrylate-based diols.

In some examples, the OPV comprises 30 wt. % or more radiation curable resin, in some examples, 35 wt. % or more, in some examples, 40 wt. % or more, in some examples, 45 wt. % or more, in some examples, 50 wt. % or more, in some examples, 55 wt. % or more, in some examples, about 60 wt. % radiation curable resin. In some examples, the OPV comprises 60 wt. % or less, in some examples, 55 wt. % or less, in some examples, 50 wt. % or less, in some examples, 45 wt. % or less, in some examples, 40 wt. % or less, in some examples, 35 wt. % or less, in some examples, about 30 wt. % radiation curable resin. In some examples, the OPV comprises 30 wt. % to 60 wt. % radiation curable resin, in some examples, 35 wt. % to 55 wt. %, in some examples, 40 wt. % to 50 wt. %, in some examples, 45 wt. % to 50 wt. %, in some examples, 40 wt. % to 45 wt. % radiation curable resin.

In some examples, the OPV comprises an acrylic resin in combination with a carrier liquid comprising water and therefore in the form of an acrylic resin aqueous dispersion. In some examples, the acrylic resin aqueous dispersion may comprise 30 wt. % to 70 wt. % acrylic resin, in some examples, 35 wt. % to 65 wt. %, in some examples, 40 wt. % to 60 wt. %, in some examples, 45 wt. % to 55 wt. %, in some examples, 50 wt. % to 55 wt. % acrylic resin.

In some examples, the OPV is deposited on the print substrate such that the coat weight of the OPV resin on the print substrate is in the range of about 0.5 g·m$^{-2}$ to about 10 g·m$^{-2}$, in some examples about 1 g·m$^{-2}$ to about 5 g·m$^{-2}$, in some examples about 2 g·m$^{-2}$ to about 5 g·m$^{-2}$, in some examples about 3 g·m$^{-2}$ to about 5 g·m$^{-2}$, in some examples about 4 g·m$^{-2}$ to about 5 g·m$^{-2}$.

In some examples, the curable OPV composition comprises 10 wt. % or less of a cross-linking additive based on the total weight of the curable overprint varnish composition.

The cross-linking additive may be for cross-linking a thermoplastic resin of the ink composition to a resin of the primer composition. Crosslinking between the thermoplastic resin of the ink and the primer may improve binding between the OPV and the ink composition, reduce the mobility of the ink composition and improve the mechanical durability and chemical resistance of the printed flexible material.

In some examples, the curable overprint varnish composition comprises a cross-linking additive in an amount greater than about 0.01 wt. % by total weight of the curable overprint varnish composition, in some examples greater than about 0.1 wt. %, in some examples greater than about 0.5 wt. %, in some examples greater than about 1 wt. %, in some examples greater than about 1.5 wt. %, in some examples greater than about 2 wt. %, in some examples greater than about 2.5 wt. %, in some examples greater than about 3 wt. %, in some examples about 4 wt. % or greater, in some examples about 5 wt. % or greater, in some examples about 5 wt. %.

In some examples, the curable overprint varnish composition comprises a cross-linking additive in an amount no more than 10 wt. % by total weight of the curable overprint varnish composition, in some examples no more than 7 wt. %, in some examples up to about 5 wt. %.

In some examples, the curable overprint varnish composition comprises a cross-linking additive in an amount within the range of about 0.5 wt. % to about 5 wt. % by total weight of the curable overprint varnish composition.

The cross-linking additive may comprise any cross-linker functional group (also referred to as the cross-linker) suitable to crosslink the thermoplastic resin of the ink composition to a resin of the primer.

In some examples, the cross-linking additive comprises a cross-linker which is reactive towards a carboxylic functional group, an amine functional group, a polyol functional group, or a combination thereof.

In some examples, the cross-linking additive comprises a cross-linker which is reactive towards a carboxylic functional group and/or an amine functional group.

For example, when the thermoplastic resin and/or the primer comprise a carboxylic functional group the cross-linker may comprise an epoxide, an aziridine, an organic metallic complex or ion, an organosilane, an epoxy organosilane, a carbodiimide, an isocyanate or an acetyl acetonate.

For example, when the thermoplastic resin and/or the primer comprise an amine functional group, the cross-linker may comprise an epoxide, an aziridine, an isocyanate, a maleic anhydride, an isocyanate alkyl organosilane, an epoxy organosilane, a carbodiimide, an aldehyde, a ketone, an acetyl acetonate, an isothiocyanate, an acyl azide, an NHS ester, a sulfonyl chlorides glyoxal, a carbonate, an aryl halide or an imidoester.

In some examples, when the thermoplastic resin comprises a polymer having acid side groups and the primer comprises an amine functional group, the cross-linker may be selected from an epoxy-based cross-linker, an aziridine-based cross-linker, an isocyanate-based cross-linker or a carbodiimide-based cross-linker. In some examples, when the thermoplastic resin comprises a polymer having acid side groups and the primer comprises an amine functional group, the cross-linker may be an epoxy-based cross-linker.

In some examples, the cross-linking additive comprises a cross-linker selected from an epoxide, an aziridine, an isocyanate, a maleic anhydride, an organic metallic complex or ion, an organosilane, an epoxy organosilane, a carbodiimide, an aldehyde, a ketone, an acetyl acetonate or combinations thereof. For example, the cross-linking additive may comprise an epoxide, an aziridine, an isocyanate, a maleic anhydride, an organic metallic complex or ion, an organosilane, an epoxy organosilane, a carbodiimide, an aldehyde, a ketone, an acetyl acetonate or combinations thereof.

In some examples, the cross-linking additive comprises a cross-linker selected from an epoxide, an aziridine, an isocyanate and a carbodiimide. For example, the cross-linking additive may comprise an epoxide, an aziridine, an isocyanate, or a carbodiimide.

In some examples, the cross-linking additive comprises a cross-linker selected from an epoxide, an aziridine, and a carbodiimide. For example, cross-linking additive may comprise an epoxide, an aziridine, or a carbodiimide.

In some examples the cross-linking additive comprises an epoxide as the cross-linker.

In some examples the epoxy-based cross-linking additive is selected from the DECH family of epoxy-based cross-linking additives (including 3,4-epoxycyclohexylmethyl 3,4-epoxycyclohexanecarboxylate and 7-oxabicyclo[4.1.0]hept-3-ylmethyl 7-oxabicyclo[4.1.0]heptane-3-carboxylate) and tris(4-hydroxyphenyl)methane triglycidyl ether. In some examples the epoxy-based cross-linking additive is selected from 3,4-Epoxycyclohexylmethyl 3,4-epoxycyclohexanecarboxylate and 7-oxabicyclo[4.1.0]hept-3-ylmethyl 7-oxabicyclo[4.1.0]heptane-3-carboxylate, in some examples 7-oxabicyclo[4.1.0]hept-3-ylmethyl 7-oxabicyclo[4.1.0]heptane-3-carboxylate.

In some examples, the cross-linking additive is an aziridine-based cross-linking additive, for example a polyaziridine. The term 'polyaziridine' is used herein to refer to a molecule comprising at least two aziridine groups, e.g. of the formula —N(CH$_2$CR$^2$H), wherein R$^2$ is selected from H and alkyl (e.g. methyl), in some examples wherein R$^2$ is methyl.

In some examples the aziridine-based cross-linking additive is trimethylolpropane tris(2-methyl-1-aziridinepropionate) (XAMA®-2).

In some examples, the cross-linking additive is an isocyanate-cross-linking additive, for example a polyisocyanate. The term 'polyisocyanate' is used herein to refer to a molecule comprising at least two isocyanate groups, e.g. of the formula —NCO.

In some examples, the isocyanate based cross-linking additive is selected from polymethylene diphenyl isocyanates, biuret, hexamethylene diisocyanate trimer (trimer of HDI), uretdion dimer (Alipa), blocked isocyanates (Cytec, Bayer, Alipa) and aliphatic polyisocyanates.

In some examples, the isocyanate based cross-linking additive is selected from polymethylene diphenyl isocyanates (e.g. Papi27 (Dow), Desmodur44V20 (Bayer), Suprasec5024 (Huntsman)), biuret, hexamethylene diisocyanate trimer (trimer of HDI), uretdion dimer (Alipa), blocked isocyanates (Cytec, Bayer, Alipa), aliphatic polyisocyanates, tolylene diisocyanate, diphenylmethane diisocyanate, naphthalene diisocyanate, xylylene diisocyanate, hydrogenated xylylene diisocyanate, hexamethylene diisocyanate, trimethylhexamethylene diisocyanate, isophorone diisocyanate, and methylene-bis(4-cyclohexyl isocyanate).

In some examples, the cross-linking additive is a carbodiimide-based cross-linking additive, for example a polycarbodiimide. The term 'polycarbodiimide' is used herein to refer to a molecule comprising at least two carbodiimide groups, e.g. of the formula —NCN—.

In some examples, the carbodiimide based cross-linking additive is SV-02 Carbodilite.

In some examples, the cross-linking additive is selected from organic metallic complexes or ions, for examples ionomers and $Zn^{2+}$, $Ca^{2+}$ containing compounds.

In some examples, the cross-linking additive comprises a maleic anhydride, e.g. the cross-linking additive may be a maleic anhydride-based cross-linking additive. In some examples, cross-linking additive is a polymaleic anhydride.

In some examples, the maleic anhydride-based cross-linking additive is polymaleic anhydride 1-octadecene (available from Polyscience), poly(ethylene-alt-maleic anhydride) (available from Sigma).

In some examples, the cross-linking additive comprise an anhydride. In some examples, the cross-linking additive is an anhydride based cross-linking additive, e.g. a cross-linking additive comprising the group —C(O)OC(O)—.

In some examples, the anhydride based cross-linking additive is a cyclic anhydride, in some examples a cyclic anhydride of formula (IV)

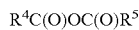

$R^4C(O)OC(O)R^5$ where $R^4$ and $R^5$ are linked to form an optionally substituted ring.

In some examples, the anhydride based cross-linking additive is glutaric anhydride or phtalic anhydride.

In some examples, the cross-linking additive comprises a polyanhydride, for example polyacrylic anhydride or polymethacrylic anhydride.

In some examples, the cross-linking additive comprises an aldehyde. In some examples, the cross-linking additive is an aldehyde-based cross-linking additive, for example a polyaldehyde. The term 'polyaldehyde' is used herein to refer to a molecule comprising at least two aldehyde groups, e.g. of the formula —C(O)H.

In some examples, the cross-linking additive comprises a ketone. In some examples, the cross-linking additive is a ketone-based cross-linking additive, for example a polyketone. The term 'polyketone' is used herein to refer to a molecule comprising at least two ketone groups.

In some examples, the cross-linking additive comprises an acetyl acetonate. In some examples, the cross-linking additive is an acetyl acetonate based cross-linking additive, for example acetoacetoxyethyl methacrylate (Eastman™ AAEM).

In some examples, the cross-linking additive comprises an organosilane, for example a cross-linking additive comprising a silane group. In some examples, the organosilane may have the following structure:

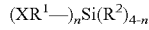

$(XR^1—)_nSi(R^2)_{4-n}$ in which:
XR¹— is a non-hydrolysable organic moiety, wherein X is a terminal group and $R^1$ is a linker group;
$R^2$ is a hydrolysable organic moiety; and
n is 0, 1, 2 or 3.

In some examples, n is 1, 2 or 3. In some examples, n is 1.

In some examples, $XR^1$ is a non-hydrolysable organic moiety. In some examples, $XR^1$ is a non-hydrolysable organic moiety wherein X is a terminal group and $R^1$ is a linker group. In some examples, $XR^1$ may comprise a substituted or unsubstituted hydrocarbon.

In some examples, each $R^1$ is independently selected from $(CH_2)_m$ (wherein m may be 0, 1, 2, 3 or more), alkenylene, alkynylene, aryl, alkylarylene and arylalkylene, wherein when m is 0, the linker group is a single bond. In some examples, $R^1$ is $(CH_2)_m$ and m is 0, 1, 2, or 3. In some example, $R^1$ is $(CH_2)_m$ and m is 1, 2, or 3. In some examples, $R^1$ is $(CH_2)_3$.

In some examples, X is a terminal group. In some examples, each X is independently selected from hydrogen, halogen, vinyl, alkyl, alkenyl, acrylate, methacrylate, amino, alkylamino, aminoalkylamino, arylamino, benzylamino, alkylamido, alkylcarboxy, aryl-amido, arylcarboxy, alkyl-carbamate, hydroxyl, alkoxy, thio, alkylthio, epoxy, glycidoxy, isocyanato.

In some examples, X is selected from (meth)acrylamide, (meth)acryloxy, (meth)acryloxyalkylamide, (meth)acryloxyalkylaryl, (meth)acryloxyaryl, amino, alkylamino, dialkylamino, arylamino, diarylamino, arylalkylamino, aminoaryl, arylamino, pyrimidyl, pyrrolyl, hydroxyalkylamino, dihydroxyalkylamino, alkoxyalkylamino, and dialkoxyalkylamino. In some examples, X is selected from glycidoxy, amino, vinyl, acryoyl, methacroyl, aminoethylamino, benzylamino, halo, chloro, and thio.

In some examples, $XR^1$ is selected from glycidoxy methyl, glycidoxy ethyl, glycidoxy propyl, aminomethyl, aminoethyl, aminopropyl, methacroylmethyl, methacroylethyl, methacroylpropyl, acroylmethyl, acroylethyl, acroylpropyl, vinyl, vinylmethyl, vinylethyl, vinylpropyl, aminomethylaminomethyl, aminoethylaminomethyl, aminopropylamino-methyl, aminomethylaminoethyl, aminoethylaminoethyl, aminopropylaminoethyl, aminomethylaminopropyl, aminoethylaminopropyl, aminopropylaminopropyl, chloromethyl, chloroethyl, chloropropyl, benzylamino, thiomethyl (i.e., mercaptomethyl), thio-ethyl (i.e., mercaptoethyl), and thiopropyl (i.e., mercaptopropyl).

In some examples, $R^2$ is a hydrolysable organic moiety. In some examples, each $R^2$ may be the same or different. In some examples, each $R^2$ is selected from the group consisting of halogens, $OR^3$, $NR^3R^4$, phosphates, sulfates, oxides and $OSiR^3_3$. In some examples, $R^3$ and $R^4$ may be independently selected from hydrogen, substituted or unsubstituted alkyl, substituted or unsubstituted carboxyl, substituted or unsubstituted alkenyl, substituted or unsubstituted alkynyl and substituted or unsubstituted aryl.

In some examples, each $R^2$ may be $OR^3$. In some examples, each $R^2$ may be selected from hydroxyl, methoxy, ethoxy, isopropoxy, propoxy, tert-butyoxy, isobutoxy, butoxy, methoxyethoxy, methoxy-2-propoxy, methoxyethoxyethyoxy, acetoxy, isopropenoxy, and methylethylketoximino. In some examples, each $R^2$ may be selected from hydroxyl, methoxy, ethoxy, isopropoxy, and propoxy. In some examples, each $R^2$ may be selected from hydroxyl, methoxy and ethoxy. In some examples, each $R^2$ may be selected from methoxy and ethoxy.

In some examples, n is 1 and $R^2$ is $OR^3$. In some examples, each $R^2$ is the same. In some examples, $R^2$ may be selected from hydroxyl, methoxy, ethoxy, isopropoxy, propoxy, tert-butyoxy, isobutoxy, butoxy, methoxyethoxy, methoxy-2-propoxy, methoxyethoxyethyoxy, acetoxy, isopropenoxy, and methylethylketoximino. In some examples, $R^2$ may be selected from hydroxyl, methoxy, ethoxy, isopropoxy, and propoxy. In some examples, $R^2$ may be selected from hydroxyl, methoxy and ethoxy. In some examples, $R^2$ may be selected from methoxy and ethoxy.

In some examples, $R^1$ and $R^2$ together form a ring moiety. In some examples, $R^1$ and $R^2$ together form a ring moiety and the organosilane is a cyclic azasilane.

In some examples, the organosilane is selected from glycidoxy propyloxy trialkoxysilane, aminopropyloxy trialkoxysilane, vinyltrialkoxysilane, methacrroyl propyl trialkoxysilane, vinyl propyl trialkoxysilane, aminoethyl aminopropyl trialkoxysilane, benzyl amino trialkoxysilane, chloropropyl trialkoxysilane, and mercapto propyl trialkoxysilane. In some examples, the organosilane is selected from glycidoxy propyloxy trialkoxysilane, aminopropyloxy trialkoxysilane, vinyltrialkoxysilane, methacroyl propyl trialkoxysilane, vinyl propyl trialkoxysilane, aminoethyl aminopropyl trialkoxysilane, benzyl amino trialkoxysilane, chloropropyl trialkoxysilane, and mercapto propyl trialkoxysilane and the alkoxy group is selected from methoxy, ethoxy, isopropoxy, and propoxy.

In some examples, the cross-linking additive comprises an epoxyorganosilane selected from (3-glycidoxypropyl) triethoxysilane, (3-glycidoxypropyl)trimethoxysilane and oligomeric polyepoxysilanes.

In some examples, the curable overprint varnish composition further comprises one or more additives that may include slip agents, stabilizers, matting agents, flow additives, defoamers as are known in the art.

When present in the flexible printed material or flexible package, references to the overprint varnish composition being formed from an ethylenically unsaturated monomer, an ethylenically unsaturated oligomer and mixtures thereof, and 10 wt. % or less of a cross-linking additive based on the total weight of the curable overprint varnish composition will be understood as meaning that the overprint varnish composition is the electron beam cured product of a curable overprint varnish composition comprising ethylenically unsaturated monomer, an ethylenically unsaturated oligomer and mixtures thereof, and 10 wt. % or less of a cross-linking additive based on the total weight of the curable overprint varnish composition.

Method of Forming a Flexible Printed Material

Described herein is a method of forming a flexible printed material comprising: applying a layer of primer onto a flexible substrate; electrostatically printing onto the layer of primer a liquid electrostatic ink composition; applying a curable overprint varnish composition onto the printed electrostatic ink composition, wherein the curable overprint varnish composition comprises an ethylenically unsaturated monomer and less than 10 wt. % of a cross-linking additive based on the total weight of the curable overprint varnish composition; and curing the overprint varnish composition using electron beam irradiation.

The methods and processes described herein are depicted generally in FIG. 1, in which the following reference numerals are used to identify the features indicated: reference numeral "1" denotes a flexible printed material; reference numeral "2" denotes a flexible substrate; reference numeral "3" denotes a primer; reference numeral "4" denotes an ink composition; reference numeral "5" denotes an overprint varnish composition; and reference "6" denotes electron beam (EB) radiation.

FIG. 1 depicts a process in which a primer 3 is applied onto a flexible print substrate 2 on a surface thereof and an electrostatic ink composition 4 comprising a thermoplastic resin is printed on to the primer layer 3 on print substrate 2. An overprint varnish composition 5 comprising a cross-linking additive is then deposited onto the printed ink composition 4, finally the flexible printed material 1 is irradiated by EB 6 to cure overprint varnish composition 5.

In some examples, the primer 2 comprising a primer resin is provided on the print substrate in an amount such that the coat weight of the primer resin measured over the area of the first surface of the print substrate is at least 0.01 g/m², in some examples at least 0.05 g/m², in some examples at least 0.1 g/m², in some examples at least 0.15 g/m², in some examples about 0.18 g/m². In some examples the primer is provided in an amount such that the coat weight of the primer resin measured over the area of the first surface of the print substrate is up to about 0.2 g/m², in some examples up to about 0.5 g/m², in some examples up to about 1 g/m², in some examples up to about 1.5 g/m².

In some examples, the primer may be applied on the flexible print substrate using any technique standardly used, for example, gravure coating, flexo coating, screen coating or electrophotographic printing. In some examples, the primer may be applied on the flexible print substrate using a process in-line with the printing of the ink composition to the surface of the flexible print substrate on which the primer is applied. In some examples, the process comprises applying a corona treatment to the surface of the flexible print substrate before application of the primer onto the surface of the print substrate.

In some examples, the process comprises applying a corona treatment to the primer disposed on the surface of the flexible print substrate before electrostatically printing an ink composition on to the primer disposed on the surface of the flexible print substrate.

In some examples, electrostatically printing an ink composition onto the flexible print substrate comprises printing an electrostatic ink composition, e.g. a liquid electrophotographic ink composition, onto the print substrate in an electrophotographic or electrostatic printing process using an electrophotographic or electrostatic printing apparatus. Examples of suitable electrophotographic or electrostatic printing equipment are the HP Indigo digital presses. In some examples, the process may comprise electrophotographically printing a liquid electrophotographic ink composition onto the print substrate.

In some examples, an ink composition comprising a thermoplastic resin is printed on the flexible print substrate in an amount such that the coat weight of the thermoplastic resin measured over the printed area is at least 0.01 g/m², in some examples at least 0.05 g/m², in some examples at least 0.1 g/m², in some examples at least 0.5 g/m², in some examples about 1 g/m². In some examples the ink composition is printed in an amount such that a coat weight of the thermoplastic resin measured over the printed area is up to about 16 g/m², in some examples up to about 10 g/m², in some examples up to about 5 g/m², in some examples up to about 4 g/m².

In some examples, the process comprises applying a corona treatment to the printed ink composition disposed on the primed flexible print substrate before application of the curable overprint varnish composition onto the printed ink composition disposed on the print substrate.

In some examples, the curable overprint varnish composition may be applied to the printed ink composition disposed on the flexible print substrate using any suitable coating process. In some examples, the curable overprint varnish composition is deposited onto the printed ink composition using a flexo coating, gravure, offset, or screen printing process. In some examples, the curable overprint varnish composition is applied onto the printed ink composition using a printing machine, in some examples, the curable overprint varnish composition is applied onto the printed ink composition using a laminator.

In some examples, the curable overprint varnish composition may be applied to the printed ink composition and primer on the print substrate which may have been left exposed after printing of the ink composition onto the primer on a surface of the print substrate.

In some examples, applying the curable overprint varnish composition on to the printed ink composition comprises applying a curable overprint varnish composition comprising the cross-linking additive for cross-linking a resin of the primer. In some examples, applying the curable overprint varnish composition on to the printed ink composition comprises applying a curable overprint varnish composition comprising the cross-linking additive for cross-linking the thermoplastic resin of the ink composition.

In some examples, applying the curable overprint varnish composition on to the printed ink composition comprises applying a curable overprint varnish composition comprising the cross-linking additive for cross-linking a resin of the primer, and the thermoplastic resin of the ink composition and. In some examples, applying the curable overprint varnish composition on to the printed ink composition comprises applying a curable overprint varnish composition comprising the cross-linking additive for cross-linking a resin of the primer to the thermoplastic resin of the ink composition.

In some examples, the curable overprint varnish composition is applied on the printed ink composition disposed on the print substrate in an amount such that the dry coat weight of the curable overprint varnish composition measured over the area printed substrate is at least 0.01 $g/m^2$, in some examples at least 0.05 $g/m^2$, in some examples at least 0.1 $g/m^2$, in some examples at least 1 $g/m^2$, in some examples at least 1.5 $g/m^2$, in some examples at least 2 $g/m^2$, in some examples at least 2.5 $g/m^2$, in some examples at least 3 $g/m^2$, in some examples at least 3.5 $g/m^2$, in some examples at least 4 $g/m^2$, in some examples at least 4.5 $g/m^2$, in some examples at least about 5 $g/m^2$, in some examples at least about 6 $g/m^2$, in some examples at least about 7 $g/m^2$, in some examples at least 10 $g/m^2$.

In some examples, the curable overprint varnish composition is applied on the printed ink composition disposed on the print substrate in an amount such that the dry coat weight of the curable overprint varnish composition measured over the area of the printed substrate is up to about 4 $g/m^2$, in some examples up to about 4.5 $g/m^2$, in some examples up to about 5 $g/m^2$.

In some examples, the curable overprint varnish composition is applied on the printed ink composition disposed on the print substrate in an amount such that the dry coat weight of the curable overprint varnish composition measured over the area of the first surface of the print substrate is from about 2.5 to about 7.5 $g/m^2$, in some examples from about 3 to about 6 $g/m^2$, in some examples from about 4 to about 5 $g/m^2$.

In some examples, the method comprises applying a corona treatment to the printed flexible substrate before depositing the curable overprint varnish composition on the flexible print substrate.

In some examples, the method of forming a flexible printed material further comprise curing, using electron beam irradiation, the curable overprint varnish composition after its application onto the printed ink composition. In some examples, curing of the curable overprint varnish composition results in the formation of a cross-linked product of the cross-linking additive and the thermoplastic resin (i.e. a cross-linked thermoplastic resin) of the ink composition. In some examples, curing of the curable overprint varnish composition results in the formation of a cross-linked product of the cross-linking additive, the thermoplastic resin (i.e. a cross-linked thermoplastic resin) of the ink and a resin of the primer.

In some examples, curing the overprint varnish composition using electron beam irradiation comprises irradiating the overprint varnish composition at an irradiation dose and for a time period sufficient to cross-link the overprint varnish composition and/or the electrostatic ink composition. In some examples, curing the overprint varnish composition using electron beam irradiation comprises irradiating with a dose of at least 5 MRad, for example at least 6 MRad, for example at least 7 MRad, for example at least 8 MRad, for example at least 9 MRad, for example at least 10 MRad, for example at least 11 MRad, for example at least 12 MRad, for example at least 13 MRad, for example at least 14 MRad, for example at least 15 MRad. In some examples, curing the overprint varnish composition using electron beam irradiation comprises irradiating with a dose of no more than 15 MRad, for example no more than 14 MRad, for example no more than 13 MRad, for example no more than 12 MRad, for example no more than 11 MRad, for example no more than 10 MRad, for example no more than 9 MRad, for example no more than 8 MRad, for example no more than 7 MRad, for example no more than 6 MRad, for example no more than 5 MRad.

In some examples, the print substrate has a second surface opposite to a first surface on which the primer, ink and overprint varnish have been applied. In some example, a sealant layer is disposed on the second surface. In some examples, the sealant layer may be deposited on the second surface of the print substrate before printing of the ink composition, deposition of the OPV. In some examples, the sealant layer may be deposited on the second surface of the print substrate after the print substrate is printed with an ink composition. In some examples, the sealant layer may be deposited on the second surface of the print substrate after the OPV has been deposited on the print substrate to protect the ink composition printed on the print substrate.

In some examples, providing a sealant layer on the print substrate comprises depositing a sealant material to form a sealant layer on the second surface of the print substrate. The material used to form the sealant layer may be as described previously. Deposition of the sealant material onto the second surface of the print substrate may take place by any suitable process, for example, extrusion coating, flexo coating, gravure or screen printing. In some examples, the print substrate and sealant layer are pre-formed as a functional substrate.

Flexible Package

In some examples there is provided a flexible package, comprising a flexible printed material comprising:
  a flexible substrate;
  a primer layer disposed on the flexible substrate;
  an electrostatic ink composition electrostatically printed on the primer layer; and
  an overprint varnish composition on the printed electrostatic ink composition, wherein the overprint varnish composition is formed from an ethylenically unsaturated monomer, an ethylenically unsaturated oligomer, or mixtures thereof, and 10 wt. % or less of a cross-linking additive based on the total weight of the curable overprint varnish composition.

In some examples, the flexible package is a flexible retort package or retort pouch. In some examples, the flexible package is suitable for sterile packaging of food and/or drink products. In some examples, the flexible package is a sealed retort package or pouch, with a consumable product sealed therein.

Retort pouches are created by forming a flexible packaging material as described herein, and then sealing one or more edges of the material together to form an open pouch. Once the food or drink has been added to the pouch, the pouch is then sealed and heated under pressure inside a retort or autoclave machine in order to kill any microorganisms present.

In some examples, the flexible printed material comprises:
- a flexible print substrate;
- a primer layer comprising a primer resin disposed on surface of the print substrate, the primer resin comprising an amine functional group;
- a printed ink layer comprising a thermoplastic resin disposed on the primer layer, the thermoplastic resin comprising a polymer having acidic side groups; and
- an overprint varnish composition formed from an ethylenically unsaturated monomer and less than 10 wt. % of an epoxy-based cross-linking additive based on the total weight of the curable overprint varnish composition.

In some examples, the process comprises:
- providing a flexible print substrate comprising a primer on a surface of the print substrate, the primer comprising a primer resin comprising an amine functional group;
- printing an ink composition comprising a thermoplastic resin onto the primer on the surface of the print substrate, the thermoplastic resin comprising a polymer having acidic side groups; and
- depositing a cross-linking composition comprising an epoxy-based cross-linker onto the printed ink composition disposed on the primer and curing the overprint varnish using electron beam irradiation such that the thermoplastic resin of the ink composition is cross-linked, a resin of the primer is crosslinked and the thermoplastic resin of the ink composition is cross-linked with the resin of the primer.

In some examples, the process comprises:
- providing a flexible print substrate comprising a primer on a surface of the print substrate, the primer comprising a primer resin comprising an amine functional group;
- printing an ink composition comprising a thermoplastic resin onto the primer on the surface of the print substrate, the thermoplastic resin comprising a polymer having acidic side groups; and
- depositing a cross-linking composition comprising an epoxy-based cross-linker onto the printed ink composition disposed on the primer and curing the overprint varnish using electron beam irradiation such that the resin of the primer is cross-linked, the thermoplastic resin of the ink composition is crosslinked, a resin of the primer is crosslinked and the thermoplastic resin of the ink composition is crosslinked with the resin of the primer.

EXAMPLES

The following illustrates examples of the materials, methods and related aspects described herein. Thus, these examples should not be considered to restrict the present disclosure, but are merely in place to teach how to make examples of compositions of the present disclosure. As such, a representative number of compositions and their method of manufacture are disclosed herein.

Example 1

Water Resistance

A pre-laminated substrate of PET12/OPA15/CPP80 was coated with 0.14-0.16 dry gsm of DP050 primer (from Michelman), using in-line coating on HP Indigo 20000 digital press.

The primed substrate was then used for LEP surface printing using liquid ElectroInk® (available from HP Indigo), with high ink coverage (300-360%).

A high gloss electron-beam overprint varnish composition was prepared by adding varying amounts of a cross-linking additive (0 wt %, 5 wt % and 10 wt % of (3-glycidoxypropyl)triethoxysilane (from abcr GmbH)) to the commercially available EB OPV EHG-2600 from Daybreak Technologies. The composition was applied to the printed surface of the substrate using a GM company coating unit. The coat weight of the OPV was 4.3-4.5 dry gsm (achieved using Anilox 10BCM).

The coated samples were then in-line irradiated by EB using an E-beam Core100/760 machine. Irradiation voltage was 100 kV with dose range of 6 to 12 MRad.

The samples were then tested for water resistance. During the test the samples were cut and immersed in tap water in a container at room temperature for different time periods (1 and 20 hours). Eventually, samples were removed from the water container and wiped before a peeling test.

The peeling test was conducted by applying an adhesive tape (3M Scotch tape 810) using a 2 kg roller on top of the OPV layer (according to Finat Test Method FTM21. The adhesive tape was then peeled off the samples. Peeling resistance was determined by visual inspection of the samples after the tape had been removed. 0% peeling resistance meant that no ink was left on the substrate after the peeling test (not desired), where 100% peeling resistance indicates no ink removal by the tape (desired result).

Table 1 summarizes the results of the peeling test after water immersion for all samples. The results indicate very poor water resistance for samples coated with the OPV w/o additive after 1 hour (30%), and no resistance at all after 20 hours. On the other hand, addition of the additive significantly improves the water resistance. For samples with 10 wt. % additive, the water resistance remains 90% even after samples immersed for 20 hours in water. This test strengthens the hypothesis that the silane groups of the cross-linking additive are hydrolyzed by surrounding water molecules and form a crosslinked silanol structure, which results in increased polymer water resistance.

TABLE 1

| Test no. | Voltage [kV] | Dose [MRad] | Additive [wt. %] | Peeling [%] (initial ink adhesion) | Peeling [%] after water (1 hr @RT) | Peeling [%] after water (20 hr @RT) |
|---|---|---|---|---|---|---|
| 1 | 100 | 6 | 0 | 100 | 30 | 0 |
| 2 | 100 | 12 | 0 | 100 | 30 | 0 |
| 3 | 100 | 6 | 5 | 100 | 70 | 20 |
| 4 | 100 | 12 | 5 | 100 | 50 | 10 |
| 5 | 100 | 6 | 10 | 100 | 90 | 90 |
| 6 | 100 | 12 | 10 | 100 | 90 | 90 |

Example 2

Retort Performance

Samples for Example 2 were prepared under the same conditions as in Example 1. This time the samples were used to prepare pouches for retort evaluation. Pouches with size of 15×20 cm were prepared by sealing in-in 2 sides of the substrate (1 with high ink coverage of 360% and one with low ink coverage of 100-200%). Sealing conditions for pouch preparation were: top jaw flat, covered with Teflon tape and heated to 210° C.; bottom jaw flat, covered silicon pad and Teflon tape, heated to 120° C.; sealing pressure 3 bar; dwell time 0.6 sec×2. The pouches were then filled with hot water (app. 85° C.) and sealed.

For the retort test, the pouches were placed in an autoclave sterilization chamber (Tuttnaver model 3870EL). The samples were placed in such a way, that the high ink coverage side lay face down on the tray. Retort conditions used were 121° C. for 20 minutes and 125° C. for 30 minutes. During the retort process the pressure in the chamber reached approximately 270 kPa. After the retort finished, the samples were removed from the chamber, dried, cooled to room temperature and visually inspected.

Tables 2 and 3 summarize the visual inspection results of the pouches under 2 different retort conditions.

The results show that addition of either 5 or 10 wt. % of organosilane prevents the OPV from cracking during the retort process. When using high dose, the additive not only prevents the OPV cracks but also improves significantly the ink discoloration (test #4 vs. test #3).

TABLE 2

| Test no. | Voltage [kV] | Dose [MRad] | Additive [wt. %] | Initial visual inspection | Post retort inspection (121° C./20 min) Discoloration | OPV cracks |
|---|---|---|---|---|---|---|
| 1 | 100 | 6 | 0 | Good pouch & seal areas | Strong | Strong |
| 2 | 100 | 12 | 0 | Good pouch & seal areas | No | Moderate |
| 3 | 100 | 6 | 5 | Good pouch & seal areas | Moderate | No |
| 4 | 100 | 12 | 5 | Good pouch & seal areas | No | No |
| 5 | 100 | 6 | 10 | Good pouch & seal areas | Moderate | No |
| 6 | 100 | 12 | 10 | Good pouch & seal areas | No | No |

TABLE 3

| Test no. | Voltage [kV] | Dose [MRad] | Additive [wt. %] | Initial visual inspection | Post retort inspection (125° C./30 min) Discoloration | OPV cracks |
|---|---|---|---|---|---|---|
| 1 | 100 | 6 | 0 | Good pouch & seal areas | Very strong | Very strong |
| 2 | 100 | 12 | 0 | Good pouch & seal areas | Strong | Strong |
| 3 | 100 | 6 | 5 | Good pouch & seal areas | Strong | No |
| 4 | 100 | 12 | 5 | Good pouch & seal areas | Weak | No |
| 5 | 100 | 6 | 10 | Good pouch & seal areas | Moderate | Weak |
| 6 | 100 | 12 | 10 | Good pouch & seal areas | Weak | Weak |

Example 3

Retort Performance

Samples for Example 3 were prepared using pre-laminated substrate of PET-HB12/OPA15/CPP70. Printing and OPV finishing were done under same conditions as in example 1, only the OPV was coated using an A B Graphics coating unit. This time a different cross-linking additive was used—(3-Glycidoxpropyl)trimethoxysilane ("Digi Guard 901" from Michelman company). 3 samples (no additive, 5 wt % and 10 wt %) were prepared under the same conditions as in Example 2 and evaluated for retort, under harsh conditions of 125° C. for 30 minutes. All 3 samples were irradiated with the same high EB dose (12MR). Table 4 summarizes the visual inspection results. The results are very similar to what was described in example 2.

TABLE 4

| Test no. | Voltage [kV] | Dose [MRad] | Additive [wt. %] | Initial visual inspection | Post retort inspection (125° C./30 min) Discoloration | OPV cracks |
|---|---|---|---|---|---|---|
| 1 | 100 | 12 | 0 | Good pouch & seal areas | Strong | Strong |
| 2 | 100 | 12 | 5 | Good pouch & seal areas | No | No |
| 3 | 100 | 12 | 10 | Good pouch & seal areas | No | Moderate |

While the materials, methods and related aspects have been described with reference to certain examples, it will be appreciated that various modifications, changes, omissions, and substitutions can be made without departing from the spirit of the disclosure. The features of any dependent claim may be combined with the features of any of the other dependent claims or any and/or any of the independent claims.

The invention claimed is:

1. A method of forming a flexible printed material, comprising:
    applying a layer of primer onto a flexible substrate;
    electrostatically printing onto the layer of primer a liquid electrostatic ink composition;
    applying a curable overprint varnish composition onto the printed electrostatic ink composition, wherein the curable overprint varnish composition comprises an ethylenically unsaturated monomer, an ethylenically unsaturated oligomer, or mixtures thereof, and 10 wt. % or less of a cross-linking additive based on the total weight of the curable overprint varnish composition; and
    curing the overprint varnish composition using electron beam irradiation.

2. A method according to claim 1, wherein the curable overprint varnish composition comprises 5 wt. % of the cross-linking additive.

3. A method according to claim 1, wherein curing the overprint varnish composition using electron beam irradiation comprises irradiating the overprint varnish composition at an irradiation dose and for a time period sufficient to cross-link the overprint varnish composition and/or the electrostatic ink composition.

4. A method according to claim 1, wherein curing the overprint varnish composition using electron beam irradiation comprises irradiating with a dose of at least 10 MRad.

5. A method according to claim 1, wherein the primer comprises a resin having a carboxylic functional group, an amine functional group or a polyol functional group.

6. A method according to claim 1, wherein liquid electrostatic ink composition comprises a polymer having acidic side groups.

7. A method according to claim 1, wherein the liquid electrostatic ink composition comprises a thermoplastic resin comprising a copolymer of an alkylene monomer and a monomer selected from acrylic acid and methacrylic acid.

8. A method according to claim 1, wherein the cross-linking additive is selected from 3,4-epoxycyclohexylmethyl 3,4-epoxycyclohexanecarboxylate, 7-oxabicyclo[4.1.0]hept-3-ylmethyl 7-oxabicyclo[4.1.0]heptane-3-carboxylate), tris(4-hydroxyphenyl)methane triglycidyl ether, glycidoxy propyl trialkoxysilane, aminopropyl trialkoxysilane, vinyltrialkoxysilane, methacroyl propyl trialkoxysilane, vinyl propyl trialkoxysilane, aminoethyl aminopropyl trialkoxysilane, benzyl amino trialkoxysilane, chloropropyl trialkoxysilane and mercapto propyl trialkoxysilane.

9. A method according to claim 1, wherein the cross-linking additive is selected from glycidoxy propyl triethoxysilane and glycidoxy propyl trimethoxysilane.

10. A method according to claim 1, wherein the flexible substrate comprises a film of a plastic material selected from polyethylene (PE), linear low density polyethylene (LLDPE), low density polyethylene (LDPE), medium density polyethylene (MDPE), high density polyethylene (HDPE) polypropylene (PP), cast (cPP) or axially oriented polypropylene (BOPP), oriented polyamide (OPA), and polyethylene terephthalate (PET).

11. A method according to claim 1, wherein the flexible substrate comprises a multilayer film with each layer of the multilayer film being of a plastic material independently selected from polyethylene (PE), linear low density polyethylene (LLDPE), low density polyethylene (LDPE), medium density polyethylene (MDPE), high density polyethylene (HDPE) polypropylene (PP), cast (cPP) or axially oriented polypropylene (BOPP), oriented polyamide (OPA), and polyethylene terephthalate (PET).

12. A method according to claim 1, wherein the curable overprint varnish composition comprises a compound selected from 2,2-bis(acryloyloxymethyl)butyl acrylate, 2-[(acryloyloxy)methyl]-2-({2,2-bis[(acryloyloxy)methyl]butoxy}methyl)butylacrylate, oxydi-1,1-propanediyl bisacrylate, hexamethylene diacrylate, (1-methyl-1,2-ethanediyl)bis([oxy(methyl-2,1-ethanediyl)]di-acrylate, 2-(2,2-bis{[2-acryloyloxy)ethanoxy]methyl}butoxy)ethyl acrylate, and 2,2-bis-(acryloyloxymethyl)butylacrylate.

13. A method according to claim 1, wherein the curable overprint varnish composition comprises a mono-functional acrylate monomer, a polyfunctional acrylate monomer, or mixtures thereof.

14. A flexible printed material, comprising:
a flexible substrate;
a primer layer disposed on the flexible substrate;
an electrostatic ink composition printed on the primer layer; and
an overprint varnish composition on the printed electrostatic ink composition, wherein the curable overprint varnish composition is formed from an ethylenically unsaturated monomer, an ethylenically unsaturated oligomer, or mixtures thereof, and less than 10 wt. % of a cross-linking additive based on the total weight of the curable overprint varnish composition.

15. A flexible package, comprising a flexible printed material comprising:
a flexible substrate;
a primer layer disposed on the flexible substrate;
an electrostatic ink composition electrostatically printed on the primer layer; and
an overprint varnish composition on the printed electrostatic ink composition, wherein the overprint varnish composition is formed from an ethylenically unsaturated monomer, an ethylenically unsaturated oligomer, or mixtures thereof, and less than 10 wt. % of a cross-linking additive based on the total weight of the curable overprint varnish composition.

* * * * *